(12) United States Patent  
Albritton (10) Patent No.: US 8,375,936 B2  
(45) Date of Patent: Feb. 19, 2013

(54) METHOD AND SYSTEM FOR OPERATING A THERMAL SOLAR SYSTEM USING A REVERSE MOTOR CONFIGURATION

(75) Inventor: Charles Wade Albritton, Hercules, CA (US)

(73) Assignee: EchoFirst, Inc., Fremont, CA (US)

( * ) Notice: Subject to any disclaimer, the term of this patent is extended or adjusted under 35 U.S.C. 154(b) by 623 days.

(21) Appl. No.: 12/639,970

(22) Filed: Dec. 16, 2009

(65) Prior Publication Data

US 2010/0170501 A1   Jul. 8, 2010

Related U.S. Application Data

(60) Provisional application No. 61/141,642, filed on Dec. 30, 2008.

(51) Int. Cl.  
*F24J 2/04* (2006.01)

(52) U.S. Cl. ........ 126/647; 126/588; 126/598; 126/621; 126/623; 165/104.34; 417/32

(58) Field of Classification Search ............. 126/570, 126/588, 598, 621, 623, 647; 136/206, 244; 165/104.34; 417/32  
See application file for complete search history.

(56) References Cited

U.S. PATENT DOCUMENTS 4,505,256 A  *  3/1985  Kirchmayer ................. 126/585  
2006/0118163 A1   6/2006  Plaisted et al.

* cited by examiner

*Primary Examiner* — Alfred Basichas  
(74) *Attorney, Agent, or Firm* — Richard T. Ogawa; Ogawa P.C.

(57) ABSTRACT

A solar energy system. The system includes a thermal solar system comprising a plurality of thermal modules spatially configured as an N by M array. In a specific embodiment, the plurality of thermal modules are configured to form an aperture region and a backside region. The system has an air moving device comprising a drive device coupled to a blower device. In a specific embodiment, the drive device is spatially disposed within a fluid drive region. The system has a controller operably coupled to the air moving device. The controller is configured to operate the blower device in a first direction to cause fluid flow from at least the fluid flow intake region to the fluid flow exit region and to maintain a temperature of no greater than about 200 Degrees Fahrenheit within the fluid drive region by at least changing the first direction of operation of the blower device to a second direction to cause fluid from a third region to flow into the fluid drive region to initiate removal of thermal energy from the fluid drive region, which prevents the drive device from overheating.

22 Claims, 11 Drawing Sheets

| Temperature at air handling unit | | | | | Temperature at Solar array | | | | | Motor | Air Flow Direction | Description |
|---|---|---|---|---|---|---|---|---|---|---|---|---|
| Below 150 set point | Above 150 set point | Time since temperature change 0.29 Seconds | Time since temperature change Equal to 30 Seconds Sensor Read | Time since temperature change greater than 30 Seconds | Below 150 set point | Above 150 set point | Time since temperature change 0.29 Seconds | Time since temperature change Equal to 30 Seconds Sensor Read | Time since temperature change greater than 30 Seconds | | | |
| Initialize | | | | | | | | | | | Off | Make sure that all switches/sensors are opeartional and in their zero state |
| Yes | No | xx | xx | xx | Yes | No | xx | xx | xx | xx | Forward | Air moves from under array through unit to house-all air temps below 150 |
| No | Yes | Yes | xx | xx | No | Yes | No | xx | xx | xx | | As day progresses, it gets hotter and hotter increasing the sun load on the array |
| No | Yes | xx | Yes | xx | No | Yes | No | xx | xx | xx | Off | Air gets too hot, motor turns off in anticipation of changing flow direction |
| No | Yes | xx | xx | Yes | No | Yes | No | xx | xx | xx | Reverse | Motor reverses and starts to bring air from outside through air handler and back flush the array |
| Yes | No | xx | Yes | xx | No | Yes | Yes | xx | xx | xx | Reverse | Air temperature is starting to climb as the cool air is brought in and back flushed down the array |
| Yes | No | xx | xx | Yes | No | Yes | xx | Yes | xx | xx | Reserve | Verified that air temperature is indeed hot and decission is made to keep the unit running in reverse air flow direction |
| Yes | No | xx | xx | xx | Yes | No | Yes | xx | xx | xx | Reserve | Unit remains in reverse air flow mode. Radian load decreases as outside air temperature cools in the evening |
| Yes | No | xx | xx | xx | Yes | No | No | Yes | xx | xx | Off | Air cools down, motor turns off in anticipation of changing flow direction |
| Yes | No | xx | xx | xx | Yes | No | xx | xx | Yes | xx | Forward | Air is cool and is verified that the temperature is indeed cool |
| Yes | No | xx | xx | xx | Yes | No | xx | xx | xx | Yes | Forward | Unit opeartes in normal mode pulling air off of the array and delivering energy to the house as needed |

METHOD AND SYSTEM FOR OPERATING A THERMAL SOLAR SYSTEM USING A REVERSE MOTOR CONFIGURATION

CROSS-REFERENCES TO RELATED APPLICATIONS

This application claims priority to U.S. Provisional Application No. 61/141,642, filed Dec. 30, 2008, commonly assigned, and incorporated by reference for all purpose herein.

BACKGROUND OF THE INVENTION

The present invention relates to operation of a thermal solar system. More particularly, the present invention provides a method and system for using a reverse flow configuration to remove thermal energy from a motor device configured for a thermal solar system. Merely, by way of example, the present invention has been applied to a thermal solar module configured on a building structure, but it would be recognized that the invention has a much broader range of applications.

Over the past centuries, the world population of human beings has exploded. Along with the population, demand for resources has also grown explosively. Such resources include raw materials such as wood, iron, and copper and energy, such as fossil fuels, including coal and oil. Industrial countries world wide project more increases in oil consumption for transportation and heating purposes from developing nations such as China and India. Obviously, our daily lives depend, for the most part, upon oil or other forms of fossil fuel, which is becoming scarce as it becomes depleted.

Along with the depletion of our fossil fuel resources, our planet has experienced a global warming phenomena, known as "global warming," which was brought to our foremost attention by our Al Gore, who is the former Vice President of the United States of America. Global warming is known as an increase in an average temperature of the Earth's air near its surface, which is projected to continue to increase at a rapid pace. Warming is believed to be caused by greenhouse cases, which are derived, in part, from use of fossil fuels. The increase in temperature is expected to cause a rise in temperature, extreme weather conditions, and higher sea levels. Ultimately, other effects include mass species extinctions, and possibly other uncertainties that may be detrimental to human beings.

Much if not all of the useful energy found on the Earth comes from our sun. Generally all common plant life on the Earth achieves life using photosynthesis processes from sun light. Fossil fuels such as oil were also developed from biological materials derived from energy associated with the sun. For most living beings on the Earth, sunlight has been essential. Likewise, the sun has been our most important energy source and fuel for modern day solar energy. Solar energy possesses many characteristics that are very desirable! Solar energy is renewable, clean, abundant, and often widespread.

As an example, solar panels have been developed to convert sunlight into energy. As merely an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successful for certain applications, there are still certain limitations. Solar cells are often costly. Depending upon the geographic region, there are often financial subsidies from governmental entities for purchasing solar panels, which often cannot compete with the direct purchase of electricity from public power companies. Additionally, the panels are often composed of silicon bearing wafer materials. Such wafer materials are often costly and difficult to manufacture efficiently on a large scale. Availability of solar panels is also somewhat scarce. That is, solar panels are often difficult to find and purchase from limited sources of photovoltaic silicon bearing materials. These and other limitations are described throughout the present specification, and may be described in more detail below.

From the above, it is seen that techniques for improving operation of a solar system are highly desired.

BRIEF SUMMARY OF THE INVENTION

According to the present invention, techniques related to operation of a thermal solar system are provided. More particularly, the present invention provides a method and system for using a reverse flow configuration to remove thermal energy from a motor device configured for a thermal solar system. Merely, by way of example, the present invention has been applied to a thermal solar module configured on a building structure, but it would be recognized that the invention has a much broader range of applications.

In a specific embodiment, the present invention provides a method for operating a thermal solar system. The method includes operating a fan device coupled to a drive device in a first direction to cause fluid flow from a first region to a second region. In a specific embodiment, the first region comprising a plenum for a thermal array. In a specific embodiment, the fan is coupled to the drive device, which is disposed in a fluid flow region between the first region and the second region. In a specific embodiment, the drive device can increase in temperature as the heated fluid from the thermal array traverses the drive device. As an example, such heated fluid and elevated temperature of the drive device lead to chronic failure and/or reliability problems of the drive device. In a specific embodiment, the method maintains a temperature of no greater than about 200 Degrees Fahrenheit within the fluid flow region by at least changing the first direction of operation of the fan device to a second direction to cause fluid from a third region to flow into the fluid flow region to initiate removal of thermal energy from the fluid flow region. In a specific embodiment, the method removes thermal energy from the thermal array using at least the flow of fluid, which is cooler in temperature, in the second direction. The method also maintains one or more portions of the plenum of the thermal array substantially free from a no flow condition for a time period of greater than ½ hour (or less than 1 minute) while the fluid flow is changing from the first direction to the second direction.

In an alternative specific embodiment, the present invention provides a solar energy system. The system includes a thermal solar system comprising a plurality of thermal modules spatially configured as an N by M array, where N is an integer greater than 1, and M is an integer greater than 2. In a specific embodiment, the plurality of thermal modules are configured to form an aperture region and a backside region. In a preferred embodiment, the aperture region faces the sun or other lighting source. In a specific embodiment, the system has an air plenum configured from at least the backside region. In a specific embodiment, the air plenum has one or more intake regions and one or more exhaust regions. The system has a first duct coupled to the one or more exhaust regions. The system also has a fluid flow region, The fluid flow region has a fluid flow intake region coupled to the first duct region, a fluid flow exit region, and an fluid drive region spatially disposed between the fluid flow intake region and the fluid flow exit region. The system has an air moving device comprising a drive device coupled to a blower device. In a specific embodiment, the drive device is spatially disposed within the fluid drive region. The system has a controller operably coupled to the air moving device. In a preferred embodiment, the controller is configured to operate the blower device in a first direction to cause fluid flow from at least the fluid flow intake region to the fluid flow exit region and to maintain a temperature of no greater than about 200 Degrees Fahrenheit within the fluid drive region by at least changing the first direction of operation of the blower device to a second direction to cause fluid from a third region to flow into the fluid drive region to initiate removal of thermal energy from the fluid drive region. In a specific embodiment, the system further has a second duct coupled to the fluid flow exit region. In a specific embodiment, the second duct region is coupled to the third region, which has a temperature of less than about 100 Degrees Fahrenheit.

Many benefits are achieved by way of the present invention over conventional techniques. For example, the present technique provides an easy to use process that relies upon conventional technologies such as thermal solar modules and drive devices, although other elements can also be used. Additionally, the method provides a process that is compatible with the instant thermal solar system without substantial modifications to equipment and processes. Preferably, the invention provides for an improved solar module operation procedure, which is less costly and easy to handle. Such solar module operation system uses a drive device coupled to a blower, which can be configured to remove thermal energy from a thermal solar module or from the drive device itself to maintain efficient and reliable operation of the solar module system according to a preferred embodiment. In a specific embodiment, the solar module system and operation can be configured using computer software from a controller or other processing device. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques related to operation of a thermal solar system are provided. More particularly, the present invention provides a method and system for using a reverse flow configuration to remove thermal energy from a motor device configured for a thermal solar system. Merely, by way of example, the present invention has been applied to a thermal solar module configured on a building structure, but it would be recognized that the invention has a much broader range of applications.

Figure 1:
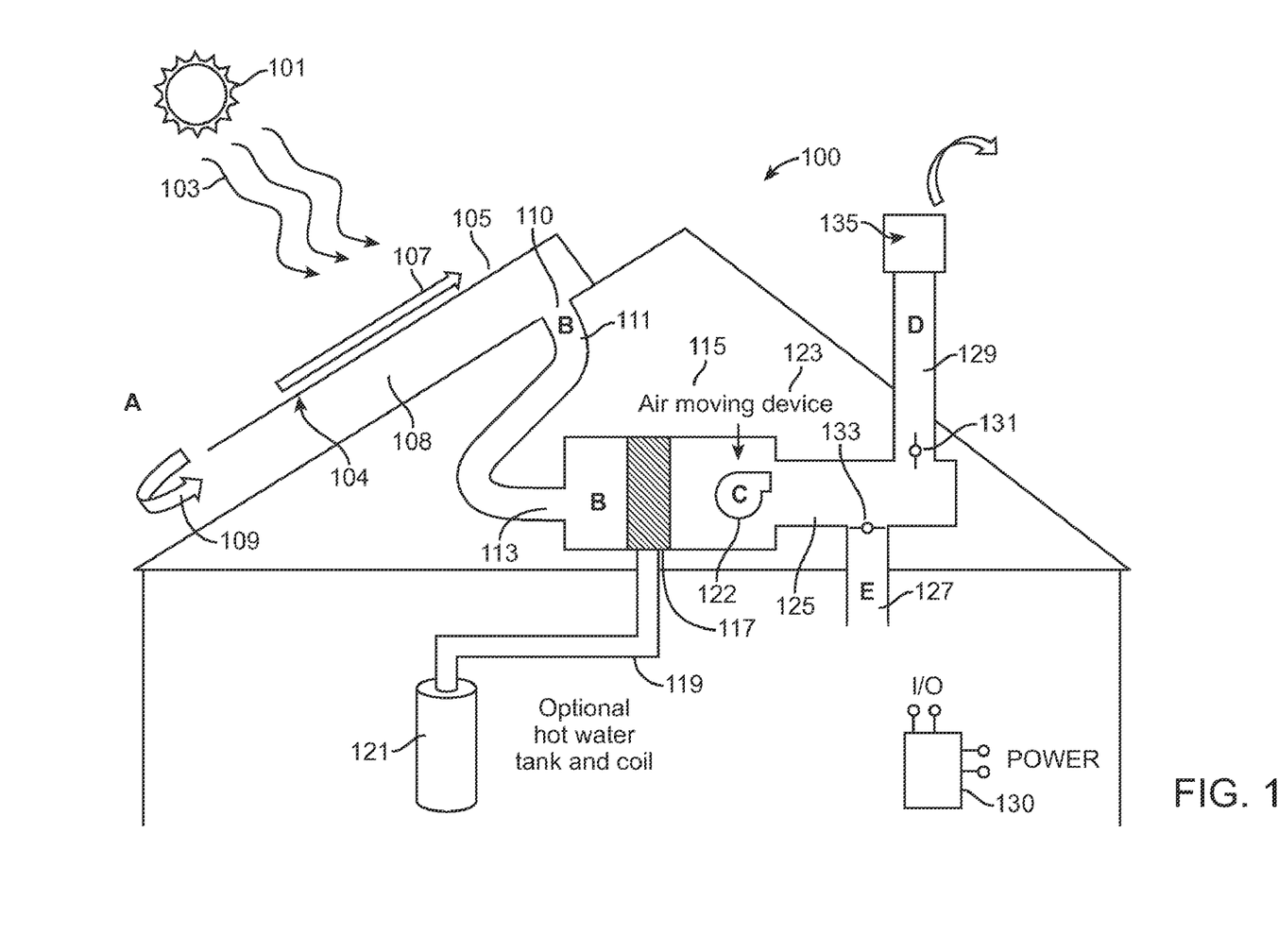
FIG. 1 is a simplified side view diagram of a thermal solar system according to an embodiment of the present invention.

FIG. 1 is a simplified side view diagram of a thermal solar system according to an embodiment of the present invention. This diagram is merely an example, which should not unduly limit the scope of the claims herein. One of ordinary skill in the art would recognize other variations, modifications, and alternatives. As shown, the thermal solar system 100 includes a plurality of thermal modules spatially configured as an N by M array, where N is an integer greater than 1, and M is an integer greater than 2 spatially disposed and attached to a building structure, such as a roof, building side, rack, or the like. In a specific embodiment, the plurality of thermal modules are configured to form an aperture region 105 and a backside region 104. In one or more embodiments, the thermal solar modules can be combined with photovoltaic modules or solely thermal modules or photovoltaic modules configured for thermal use to provide a heat source. Of course, there can be other variations, modifications, and alternatives.

In a specific embodiment, electromagnetic radiation 103 from the sun or other radiation source illuminates on the aperture region. In one or more embodiments, thermal energy is transferred through the solar module and applies the thermal energy to a working fluid 109 such as air, which traverses 107 in an upward direction through an air plenum 108 configured from at least the backside region. In a specific embodiment, the air plenum has one or more intake regions and one or more exhaust regions 110. In a specific embodiment, the one or more intake regions can be configured near a lower portion of the solar module array, although there can be other spatial locations. Additionally, the one or more exhaust regions can be a single exhaust region or multiple exhaust regions disposed spatially in a configuration near an upper portion of the solar module array. Of course, there can be other variations, modifications, and alternatives.

Referring again to FIG. 1, the system has a first duct 110 coupled to the one or more exhaust regions 110. In a specific embodiment, the first duct can couple into a fluid flow region 115 having a fluid flow intake region 113 coupled to the first duct region, a fluid flow exit region 125, and an fluid drive region 123 spatially disposed between the fluid flow intake region and the fluid flow exit region. As used herein, the terms "fluid exit region" "fluid flow intake region" "fluid drive region" and others are not intended to be limiting and should be interpreted by ordinary meaning. Also shown are valves or dampers 131 133 which respectively connect to air pathways 129 and 133 to an outside region via exhaust 135 or back into a building structure via exhaust 127. Of course, there can be other variations, modifications, and alternatives.

In a specific embodiment, the system has an air moving device 122 comprising a drive device coupled to a blower device. In a preferred embodiment, the drive device is spatially disposed within the fluid drive region. In a specific embodiment, the drive device comprises an electric motor. That is, the drive device comprises an electric motor with high temperature windings, which can withstand about 165 Degrees F. As merely an example, the electric motor is a Class F and greater under the trade association for the association of electrical and medical imaging equipment manufacturers, commonly called "NEMA." In a specific embodiment, the drive device is operable at a range from about 400 RPM to 4000 RPM, but can be others. In a preferred embodiment, the blower device comprises a fan device having a centrifugal configuration operably coupled to the drive device. Such blower device comprises a plurality of blades, which are configured to move high volumes of fluid and in particular air through the plenum. As shown, the drive device is disposed within a plenum region for fluid flow according to a specific embodiment. In a preferred embodiment, the fluid flow comprises air flow ranging in temperature from about 32 Degrees Fahrenheit to about 200 Degrees Fahrenheit based upon the temperature insulation rating of the drive device, which is spatially disposed within the air flow region.

In a specific embodiment, the system has one or more sensing device coupled to the controller device. In one or more embodiments, the controller device is coupled to one or more sensor devices operably coupled to the drive device. The one or more sensing devices are disposed spatially within a vicinity of the drive device according to a specific embodiment. In a specific embodiment, the sensing devices can be a thermocouple or other sensing device capable of receiving information that is indicative of temperature of the drive device. As an example, the sensing device can be a snap action bi-metal or the like or others. Of course, there are other variations, modifications, and alternatives.

In a preferred embodiment, the system is configured to improve the mean time between failures of the drive device. As used herein, the term "failure" generally refers to a chronic or catastrophic failure of the drive device, but can have other meanings consistent with ordinary meaning. In a specific embodiment, the drive device is characterized by a life cycle Mean Time Between Chronic Failure MTBF of greater than about 20,000 hours for a class of insulation for the drive device. In a specific embodiment, the drive device is characterized by an MTBF by about 10,000 hours and less when the temperature within the fluid drive region exceeds 200 Degrees Fahrenheit. Of course, there can be other variations, modifications, and alternatives.

In a specific embodiment, the system also has a controller 130 operably coupled to the air moving device. In a specific embodiment, the controller includes input/output for power, input/output for sensing devices; and input/output for control and/or feedback. As an example, the controller can be a computing system, including microprocessor device, memory, and input/output drivers and the like. As an example, such controller can be one developed by PVT Solar or other suitable companies such as Siemens Programmable Logic Controller, or others. Further details of a controller can be found throughout the present specification and more particularly below. Of course, there can be other variations, modifications, and alternatives.

In a specific embodiment, the controller is configured to operate the blower device in a first direction to cause fluid flow from at least the fluid flow intake region to the fluid flow exit region and to maintain a temperature of no greater than about 200 Degrees Fahrenheit within the fluid drive region. In a specific embodiment, the air moving device and preferably drive device 122 are maintained below about 200 Degrees Fahrenheit or more preferably 160 Degrees Fahrenheit or more preferably 145 Degrees Fahrenheit, but can be others. In a preferred embodiment, the controller is configured to send one or more signals to at least change the first direction of operation of the blower device to a second direction to cause fluid from a third region to flow into the fluid drive region to initiate removal of thermal energy from the fluid drive region. In a specific embodiment, the third region can be from an interior region 127 of a building structure and/or ambient region 135, such as exhaust to the air. In a preferred embodiment, cool air from the third region traverses back across the drive device to remove thermal energy there from to prevent damage to the drive device.

In a specific embodiment, the controller is also configured to maintain the air plenum formed by at least the backside of the thermal modules substantially free from a no flow condition for a time period of greater than ½ hour while the fluid flow is changing from the first direction to the second direction. In a specific embodiment, the no flow condition occurs for less than one minute. In a specific embodiment, the system substantially prevents the no flow condition to maintain the thermal solar modules free from damage and/or detrimental reliability issues. In a specific embodiment, the no flow condition occurs when the hot air through the plenum is substantially free from any air velocity or such air velocity is less than about 2 feet per minute or others. Of course, there can be other variations, modifications, and alternatives.

Referring again to FIG. 1, the system has a second duct 125 coupled to the fluid flow exit region. In a specific embodiment, the second duct region is coupled to the third region, which has a temperature of less than about 200 Degrees Fahrenheit or less than about 160 Degrees Fahrenheit or less than about 100 Degrees Fahrenheit, but can be others. As shown, the system can also include a heat exchanger 117 spatially disposed between the one or more exhaust regions and the air moving device to capture thermal energy in an efficient manner, while also reducing the temperature of fluid flow before it traverses over the drive device according to a specific embodiment. As shown, the heat exchanger couples to piping 119, which preheats water for the hot water tank 121 or other heating apparatus. Further details of the present system and related methods can be found throughout the present specification and more particularly below. A detailed description of the present rack structure and thermal solar module are described more particularly below.

Figure 2:
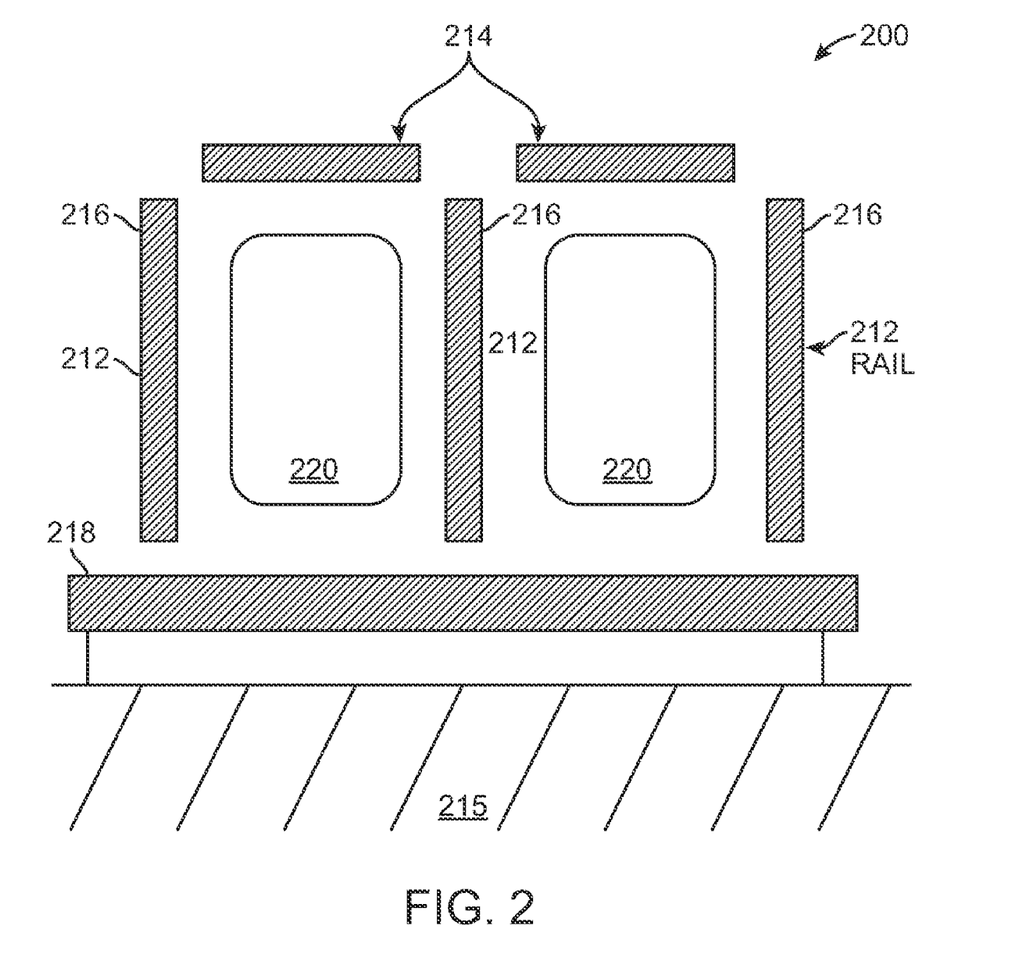
FIG. 2 is a simplified side view diagram of a rack assembly for a solar system according to an embodiment of the present invention.

FIG. 2 is a simplified side view diagram of a rack assembly for a solar system according to an embodiment of the present invention. This diagram is merely an example, which should not unduly limit the scope of the claims herein. One of ordinary skill in the art would recognize other variations, modifications, and alternatives. As shown, the rack assembly is form supporting solar modules, under one or more embodiments of the invention. In a specific embodiment, the rack assembly 210 includes a plurality of rail structures 212 that provide support for individual solar modules 214. When installed, the rail structures 212 support the individual solar modules 214 a given height h above an underlying body 215. The underlying body 215 may correspond to any surface, platform or structure on which solar modules 214 are mounted. For example, underlying body 215 may correspond to a rooftop of a commercial or residential building or other suitable structure. The solar modules 214 may correspond to photovoltaic solar cells that convert solar energy into electricity, or alternatively, solar heating modules which directly generate heat using solar energy. Alternatively, the solar cells can be a combination of photovoltaic and thermal modules according to one or more embodiments.

According to one or more embodiments, the rail structures 212 are adjustable pair-wise, or in other combinations, in order to hold in place solar modules 214 of various dimensions and sizes. In one or more embodiments, the solar modules 214 are supported by a combination of retention structures 216. Each retention structure 216 may be provided with a corresponding one of the rail structures 212. In one or more embodiments, each retention structure 216 is a structural feature of the corresponding rail structure 212. For example, each rail structure 212 may comprise of multiple interconnected segments, and the retention structure(s) may be one of the interconnected elements. Alternatively, the retention structures 216 may be integrated or unitarily formed with the individual rail structures 212. Each retention structure 216 supports individual solar modules 214 by grasping edge segments. In one or more embodiments, the retention structures 216 and/or rail structures 212 are adjustable to grasp and support solar modules 214 of varying thicknesses and forms.

Referring again to FIG. 2, an embodiment provides that rail structures 212 are mounted indirectly to the underlying body 215 through use of a set of strut runners 218. Each strut runner 218 mounts to the underlying body 215 and to multiple rail structures 212, thus providing lateral support to maintaining the rail structures 212 upright, while at the same time providing a buffer between the individual rail structures 212 and the underlying body 215. The rail structures 212 may mount to the strut runners 218, and the strut runners may mount to the underlying body 215.

According to an embodiment, the rack assembly 210 forms a portion of a solar heat exchange system that uses heat generated from the solar modules 214 for any one of various useful purposes. The heat exchange may be enabled by the formation of one or more channels 220 between an underside of solar modules 214 and the underlying body 215. An individual channel 220 may be defined in part by one or more of the rail structures 212, as well as the underlying body and possibly the underside of the solar modules 214. The individual channel 220 may occupy at least a portion of the thickness defined by the height h. The solar heat exchange system may further include other components, such as a plurality of thermal panels, as well as air directors that draw air into the channel 220, and/or push the air through the channel. When installed as part of a solar heat exchange system, the rack assembly 210 may be positioned to supply heated air to such air directors, and to be proximate to the environment that is to receive or use the heated air. For example, the rack assembly 210 may be installed on the rooftop of a dwelling, and also direct heated air into a vent or air circulation system of the dwelling as part of its ability to heat air in the channel 220. Useful purposes for generating heat from the solar modules 214 may include, for example, any one or more of the following: (i) cooling the individual solar modules 214 (when photovoltaic) so as to make them more efficient, (ii) pulling air from the environment underneath the solar modules 214 for purpose of heating the air for another closed environment or system (e.g. for a house), and (iii) circulating air from the closed environment or system underneath the solar modules 214 to heat that air and use it for heat. Of course, there can be other variations, modifications, and alternatives.

Figure 3:
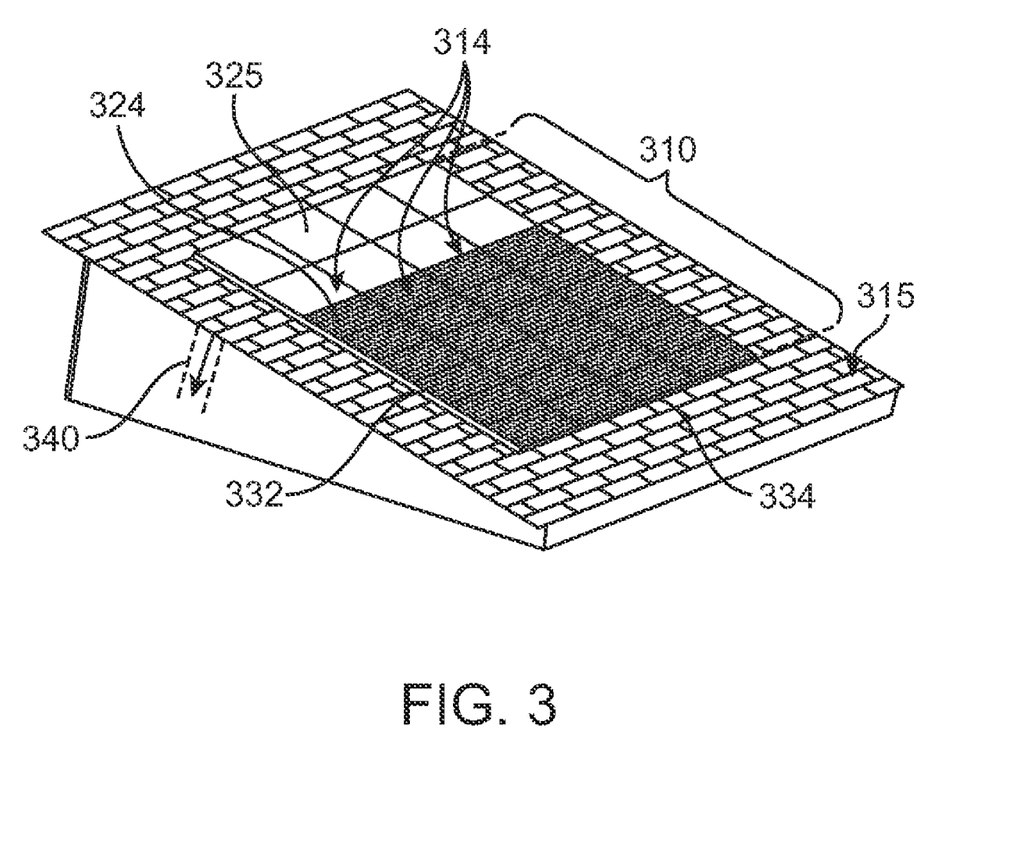
FIG. 3 is a simplified perspective view diagram of a solar system according to an embodiment of the present invention.

FIG. 3 is a simplified perspective view diagram of a solar system according to an embodiment of the present invention. This diagram is merely an example, which should not unduly limit the scope of the claims herein. One of ordinary skill in the art would recognize other variations, modifications, and alternatives. As shown, the rack assembly 310, which is installed, that supports a set of solar modules 314 over an underlying body 315. The rack assembly 310 may be structured and adapted to include features such as described with one or more embodiments of the invention. The underlying body 315 may correspond to, for example, a rooftop or roof structure of a building or dwelling. In general, the underlying body 315 may correspond to any area, surface or platform that can receive sunlight and be connected to a building, place or location that can use the solar energy.

Figure 4:
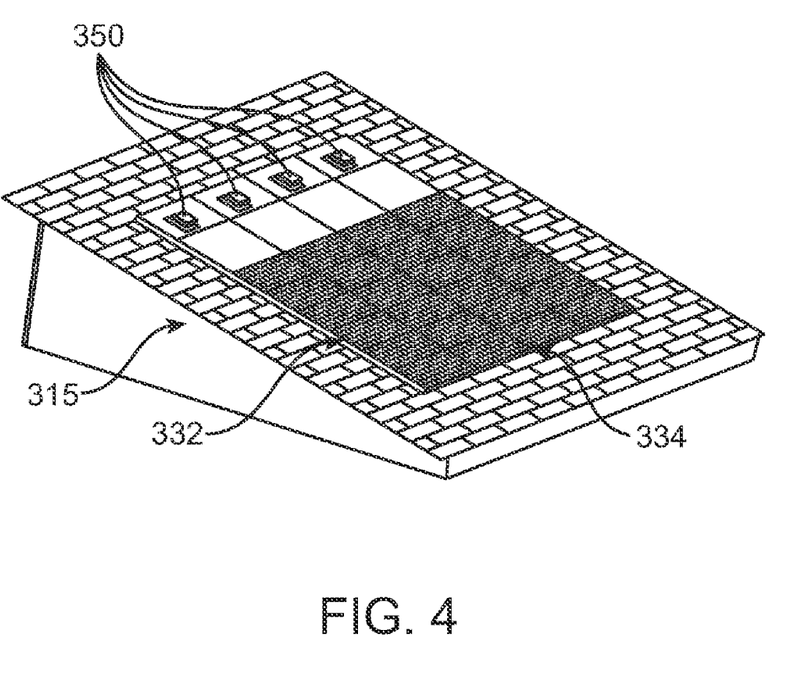
FIG. 4 is a simplified perspective view diagram of a solar system according to an alternative embodiment of the present invention.

Embodiments of the invention contemplate that different types of solar modules 314 may be employed in various implementations and context. For example, as shown by the simplified diagram of FIG. 4, the solar modules 314 include photovoltaic modules 324 and thermal modules 325. Under one or more embodiments, the perimeter may include one or more sealed lengths 332 and an open length 334 from which air from the environment is drawn. As will be described, channels (not shown) may be provided between the rack assembly 310 and underlying body 315 for purpose of constraining airflow. Air drivers (not show) may drive (e.g. push or pull) air within the formed channels. The solar modules 314 generate heat, either through design or as an inherent by-product. According to one or more embodiments, this heat warms the air as it is drawn from the environment and pulled through the channels formed underneath the solar modules 314.

Numerous alternatives and variations are contemplated. For example, all of the perimeter of the rack assembly 310 may be sealed, and air may drawn from within a dwelling on which the rack assembly 310 is provided. This air may be pushed through channels, then back into the dwelling when warmed. Alternatively, some or all of the open length 334 may be sealed, or conversely, portions of the sealed lengths 132 may be opened or perforated as part of an underlying channel system. As shown, FIG. 3 illustrates an implementation in which heated air is directed into a duct 340 within a structure of the underlying body 315. For example, warm air may heat a dwelling on which the rack assembly 310 is installed, and the duct 340 enables the heated air to flow into the circulation system of the dwelling. As mentioned, the solar modules 314 may be formed by a combination of the photovoltaic modules 324 and the thermal modules 325. The photovoltaic modules 324 can generate some residual heat when receiving solar energy and converting the solar energy into electrical current. In contrast, the thermal modules 325 may directly convert the solar energy into heat at a higher efficiency. The use and number of thermal modules 325 may depend on the use of the heated airflow, as well as the environment where the rack assembly 310 is installed. For example, when the purpose of heating air in the channels is to supply warm air to a dwelling of the underlying body 315, the thermal modules 325 have more use in colder environments, while warm environments may require only use of photovoltaic modules 324. Even in cold environments, thermal modules 325 may be used to convert solar energy into hot air due to the high operating efficiency achieved by their designs, and additional components may be used to drive the hot air into the dwelling.

Referring again to FIG. 4, multiple ventilation outlets 350 may be employed for directing heated air from under the rack assembly. As such, the ventilation outlets are located underneath the thermal modules 325. As shown with FIG. 3, the open length 334 of the perimeter is provided on one side, and the series of vents 350 are provided lengthwise on the other side of the perimeter formed by the rack assembly 310. For example, the vents 350 may guide the directed heated air inward into the structure of the underlying body 315. Of course, there can be other variations, modifications, and alternatives. As merely an example, further details of the rack assembly can be found in United States Patent Application Publication 20060118163 A1 in the names of Joshua Reed Plaisted et al., commonly assigned, and hereby incorporated by reference herein. Other rack assemblies can also be used according to one or more embodiments.

Figure 5:
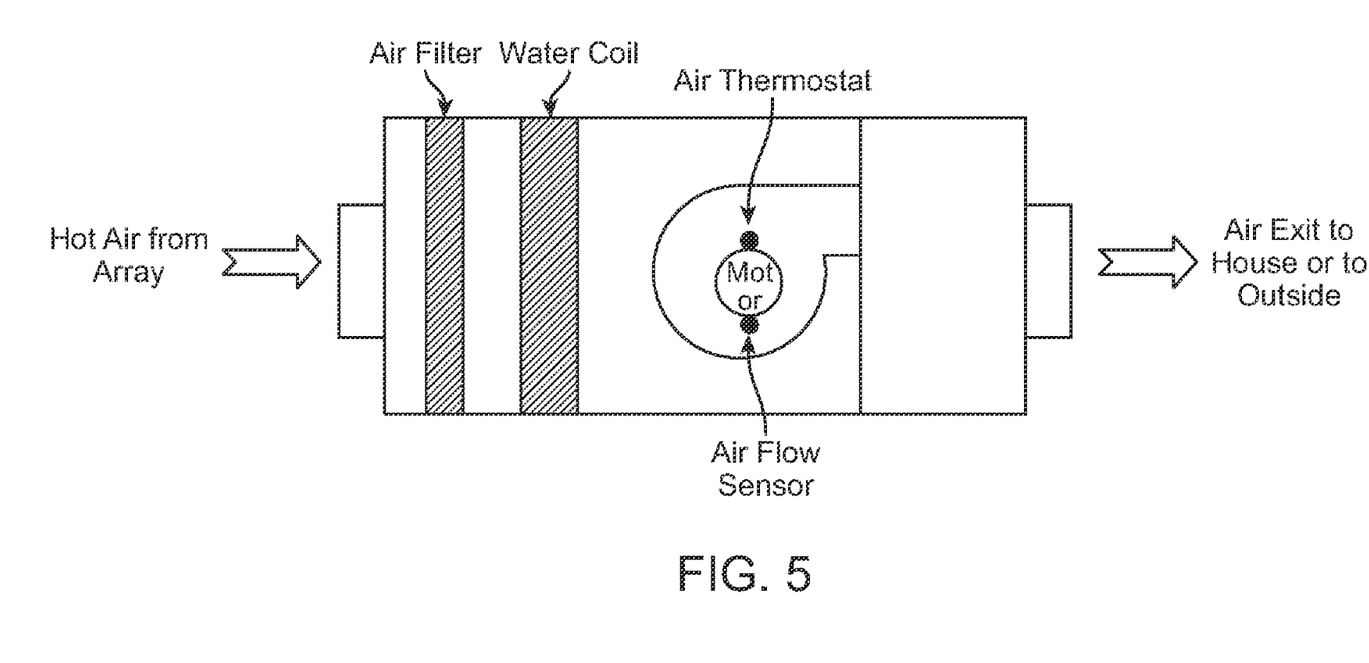
FIG. 5 is a detailed diagram of a drive device coupled to a blower device according to an embodiment of the present invention.

FIG. 5 is a detailed diagram of a drive device coupled to a blower device according to an embodiment of the present invention. This diagram is merely an example, which should not unduly limit the scope of the claims herein. One of ordinary skill in the art would recognize other variations, modifications, and alternatives. As shown, the drive device is coupled to a blower within a energy transfer module according to a specific embodiment. As shown, hot air from the array is inputted into the module through an orifice according to a specific embodiment. The hot air is filtered using a suitable filter design according to a specific embodiment. In one or more embodiments, the hot air traverses through a heat exchanger including a water coil, which receives thermal energy from the hot air from the array. In a specific embodiment, the hot air leaving the water coil is cooler as it traverses through the blower device, which outputs the air through an air exit to an interior region of a building structure or other outlets. In a specific embodiment, the blower includes an air thermostat coupled to one or more portions of the motor. In alternative embodiments, the blower also includes one or more air flow sensors. Each of the sensor devices is coupled to a controller or other suitable logic device or devices. Of course, there can be other variations, modifications, and alternatives. An example of a logic device can be found throughout the present specification and more particularly below.

Figure 6:
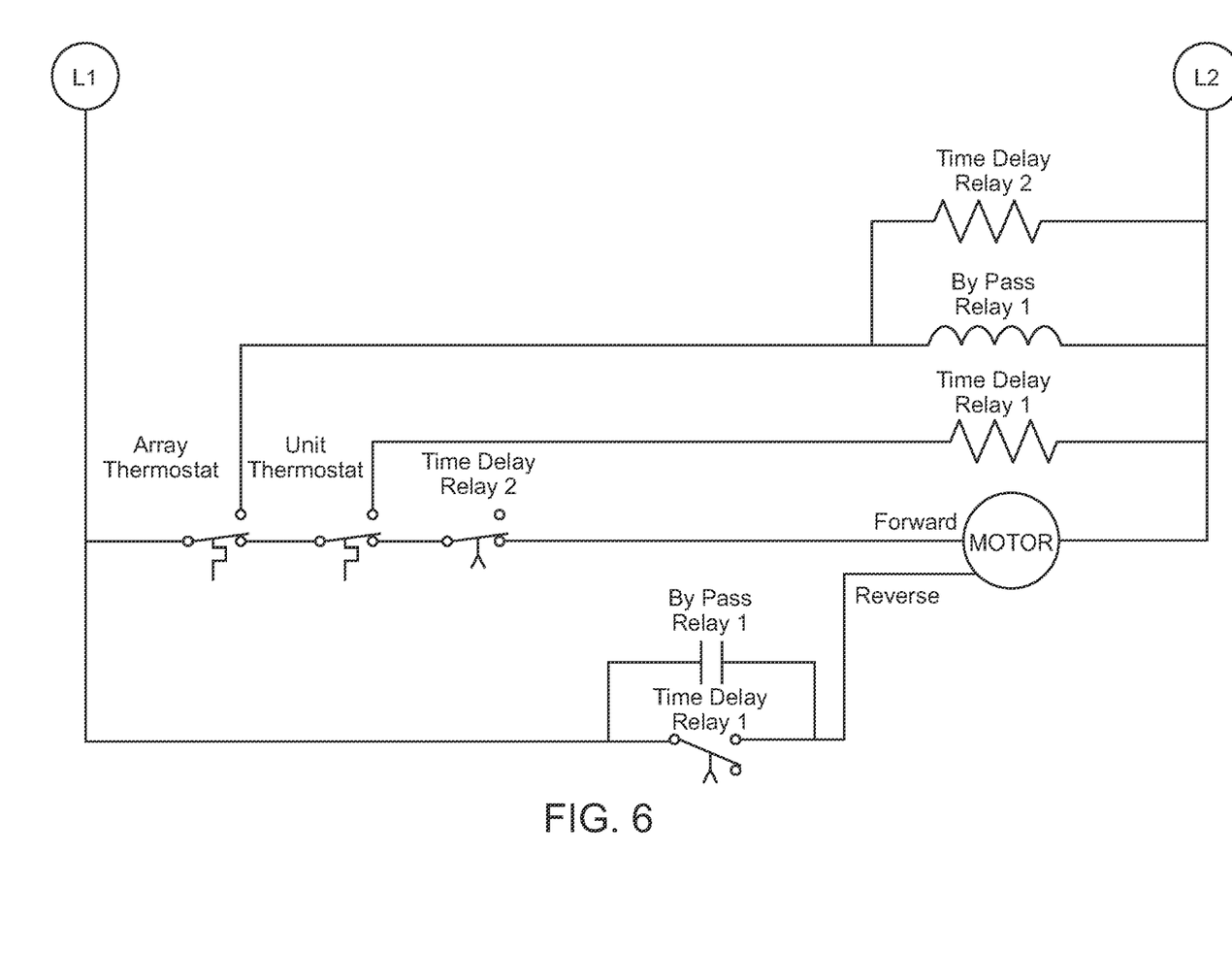
FIG. 6 is a simplified diagram of a control device for a thermal solar system according to an embodiment of the present invention.

FIG. 6 is a simplified diagram of a control device for a thermal solar system according to an embodiment of the present invention. This diagram is merely an example, which should not unduly limit the scope of the claims herein. One of ordinary skill in the art would recognize other variations, modifications, and alternatives. As shown, the control device includes a control schematic coupled between L1 and L2 according to a specific embodiment. Details of the operation of the control schematic are explained in reference to the drawing of the Figure. Of course, there can be other variations, modifications, and alternatives.

Figure 6A:
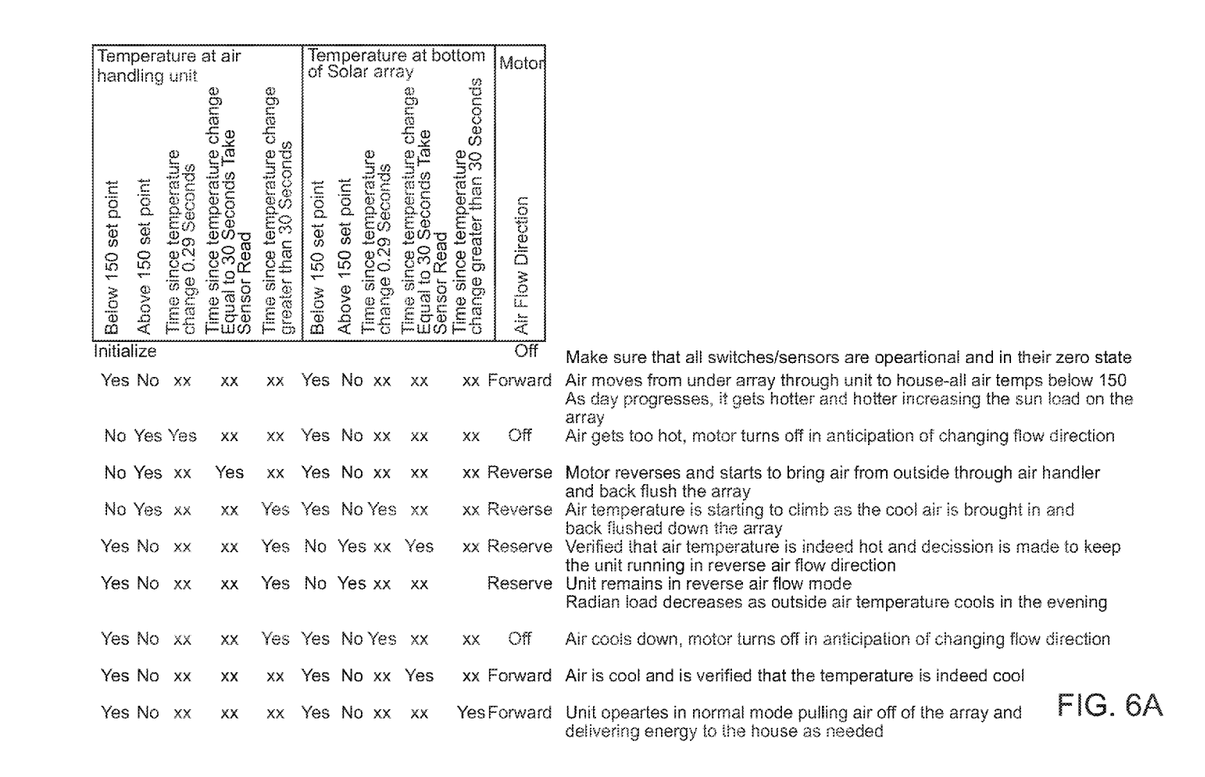
FIG. 6A is a simplified diagram of a truth table for operating the blower device according to one or more embodiments of the present invention.

FIG. 6A is a simplified diagram of a truth table for operating the blower device according to one or more embodiments of the present invention. This diagram is merely an example, which should not unduly limit the scope of the claims herein. One of ordinary skill in the art would recognize other variations, modifications, and alternatives. As shown are various settings for the blower device and sensing devices according to one or more parameters at the air handling unit and the bottom of the solar array according to a specific embodiment. Of course, there can be other variations, modifications, and alternatives.

In a specific embodiment, the present invention provides a method for operating a thermal solar system, which is briefly outlined below.
1. Provide thermal solar system;
2. Operate a fan device coupled to a drive device in a first direction to cause fluid flow from a first region to a second region;
3. Transfer fluid flow from the first region comprising a plenum for a thermal array to a second region using a fan coupled to a drive device disposed in a fluid flow region between the first region and the second region;
4. Maintain a temperature of no greater than about 200 Degrees Fahrenheit within the fluid flow region by at least changing the first direction of operation of the fan device to a second direction to cause fluid from a third region to flow into the fluid flow region;
5. Initiate removal of thermal energy from the fluid flow region by the change in direction using cooler air from the third region;
6. Remove thermal energy from the thermal array using at least the flow of fluid in the second direction;
7. Maintain the thermal array substantially free from a no flow condition for a time period of greater than ½ hour (or less than 1 minute) while the fluid flow is changing from the first direction to the second direction;
8. Change the direction of fluid flow from the second direction back to the first direction to continue operation of the thermal solar system;
9. Continue to monitor the temperature of the fluid flow region; and
10. Perform other steps, as desired.

The above sequence of steps provides a method of operating a thermal solar system according to an embodiment of the present invention. In a specific embodiment, the present invention provides a method and resulting operation to maintain a temperature of a fluid flow region, which may prevent breakage or failure of a fan device operably disposed within the fluid flow region. In a preferred embodiment, the method can be provided using a configured control device in the system using computer software and/or firmware. Other alternatives can also be provided where steps are added, one or more steps are removed, or one or more steps are provided in a different sequence without departing from the scope of the claims herein. Further details of the present method and system can be found throughout the present specification and more particularly below.

Figure 7:
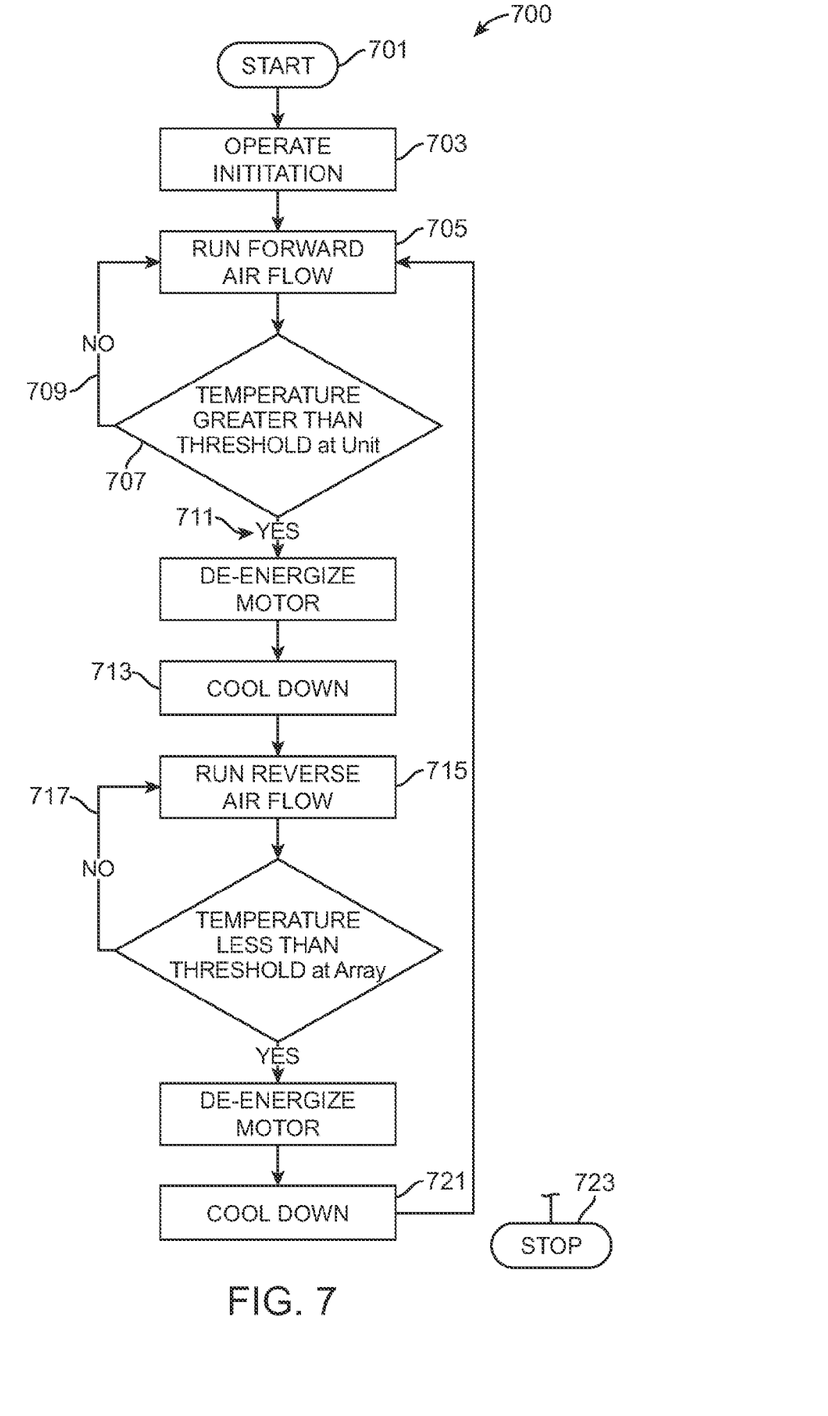
FIG. 7 is a simplified flow diagram of a method of operating a blower device in reverse configuration according to an embodiment of the present invention.

FIG. 7 is a simplified flow diagram 700 of a method of operating a blower device in reverse configuration according to an embodiment of the present invention. This diagram is merely an example, which should not unduly limit the scope of the claims herein. One of ordinary skill in the art would recognize other variations, modifications, and alternatives. As shown, the present method provides for a method for operating a thermal solar system, which is briefly outlined below. In a specific embodiment, the thermal solar system can be the one described herein as well as others. As shown, the method begins with start, step 701.

In a specific embodiment, the method initiates operation (step 703) of the thermal solar system. The system includes a thermal solar system comprising a plurality of thermal modules spatially configured as an N by M array, where N is an integer greater than 1, and M is an integer greater than 2. In a specific embodiment, the plurality of thermal modules are configured to form an aperture region and a backside region. In a preferred embodiment, the aperture region faces the sun or other lighting source. In a specific embodiment, the system has an air plenum configured from at least the backside region. In a specific embodiment, the air plenum has one or more intake regions and one or more exhaust regions. The system has a first duct coupled to the one or more exhaust regions. The system also has a fluid flow region. The fluid flow region has a fluid flow intake region coupled to the first duct region, a fluid flow exit region, and an fluid drive region spatially disposed between the fluid flow intake region and the fluid flow exit region.

In a specific embodiment, the system has an air moving device comprising a drive device (e.g., electric motor, geared electric motor)) coupled to a blower device such as a fan or other suitable air moving device. In a specific embodiment, the drive device is spatially disposed within the fluid drive region. The system has a controller operably coupled to the air moving device. In a preferred embodiment, the controller is configured to operate the blower device in a first direction to cause fluid flow from at least the fluid flow intake region to the fluid flow exit region and to maintain a desired temperature within the fluid drive region by at least changing the first direction of operation of the blower device to a second direction to cause fluid from a third region to flow into the fluid drive region to initiate removal of thermal energy from the fluid drive region. In a specific embodiment, the system further has a second duct coupled to the fluid flow exit region. In a specific embodiment, the second duct region is coupled to the third region, which provides cooler air for removing the thermal energy from the fluid flow region and in particular the drive device. Of course, there can be other variations, modifications, and alternatives.

In a specific embodiment, referring back to FIG. 7, the method operates or runs (step 705) the fan device coupled to the drive device in a first direction to cause fluid flow from a first region to a second region. The method transfers fluid flow from the first region comprising the plenum for the thermal array to the second region using the fan coupled to the drive device disposed in the fluid flow region between the first region and the second region. As used herein, the terms "first" and "second" are not intended to imply order but should be interpreted by ordinary meaning. As shown, the method monitors temperature to see if it is above a threshold temperature, if so, the method continues via branch 711 to a cool down process, step 713. Alternatively, the method continues via branch 709 to continue to operate and run the drive device to continue to move air through the thermal solar array according to a specific embodiment.

In a specific embodiment, the method maintains a desired temperature (e.g., no greater than about 200 Degrees Fahrenheit) within the fluid flow region. In a preferred embodiment, the method uses a controller configured to transfer signals to at least change (step 715) the first direction of operation of the fan device to a second direction to cause fluid from a third region to flow into the fluid flow region. In a specific embodiment, the method initiates removal of thermal energy from the fluid flow region by the change in direction using cooler air from the third region. That is, cooler air from the third region flows back through the fluid flow region and traverses the drive device to draw and remove thermal energy from the drive device. Of course, there can be other variations, modifications, and alternatives.

In a specific embodiment, the method monitors temperature of the fluid flow region and continues to transfer fluid via branch 717 from the third region to the fluid flow region, as long as the temperature is above a threshold temperature. If the temperature becomes below the threshold temperature (step 719), the method changes the direction of fluid flow by switching the operation of the fan device from the second direction back to the first direction to allow fluid flow to occur through the intake of the thermal array, through the thermal array, though the ducting, and for use at one or more applications, which have been described herein, as well as outside of the specification. In a specific embodiment, the method returns to run (step 705) via branch 721. Of course, there can be other variations, modifications, and alternatives.

In a specific embodiment, the method also removes thermal energy from the thermal array using at least the flow of fluid in the second direction when the fan device is operating in a reverse configuration of operation. The method preferably maintains the thermal array substantially free from a no flow condition for a time period of greater than ½ hour (or less than 1 minute) or other desired time frame while the fluid flow is changing from the first direction to the second direction. In a specific embodiment, the no flow condition is detrimental and may lead to damage of the thermal array. As shown, the method stops at step 723. Of course, the method can also perform other steps, as desired. Again, there can be other variations, modifications, and alternatives.

The above sequence of steps provides a method of operating a thermal solar system according to an embodiment of the present invention. In a specific embodiment, the present invention provides a method and resulting operation to maintain a temperature of a fluid flow region, which may prevent breakage or failure of a fan device operably disposed within the fluid flow region. In a preferred embodiment, the method can be provided using a configured control device in the system using computer software and/or firmware. Other alternatives can also be provided where steps are added, one or more steps are removed, or one or more steps are provided in a different sequence without departing from the scope of the claims herein. Of course, there can be other variations, modifications, and alternatives.

Figure 8:
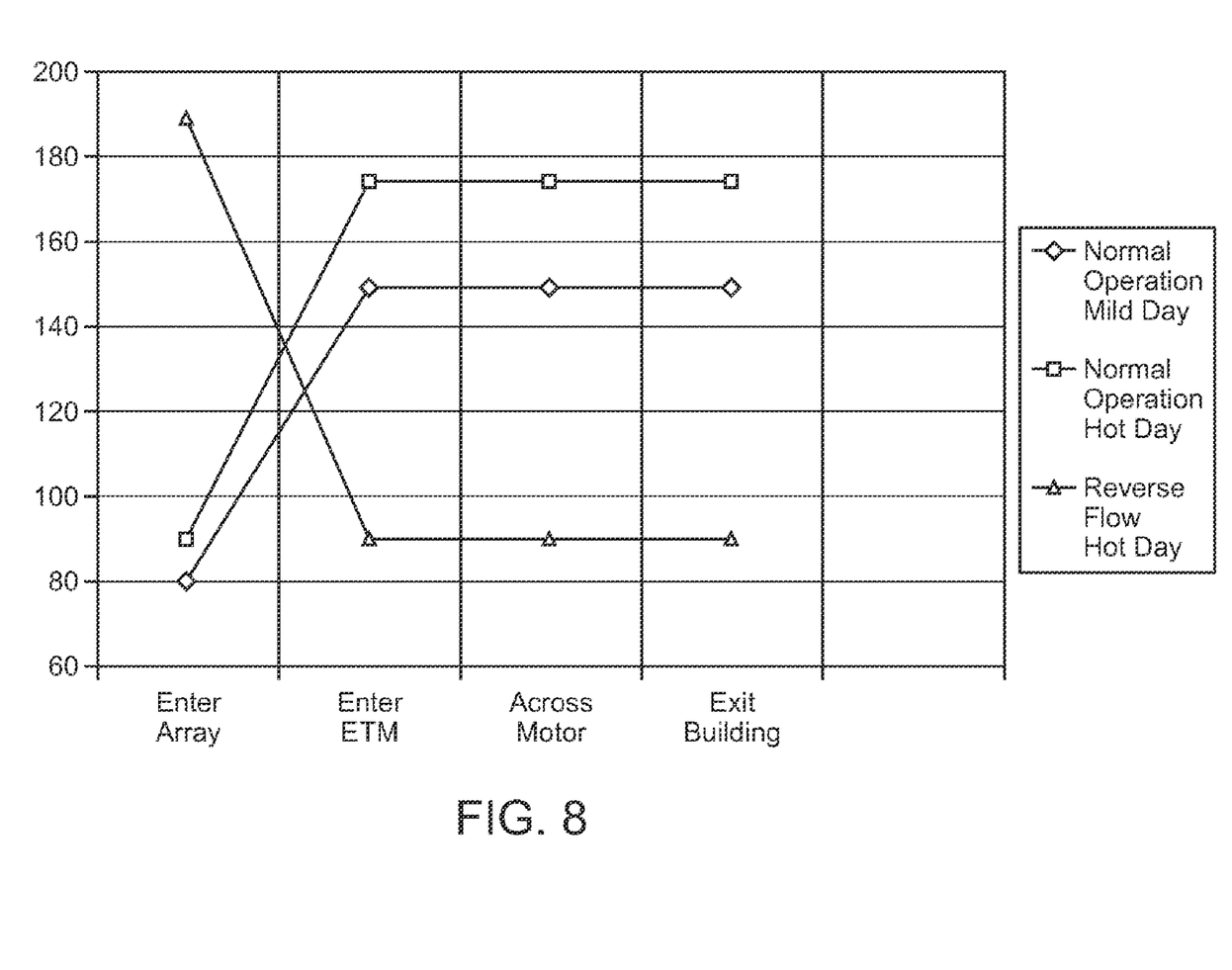
FIG. 8 is a simplified plots of air temperature for normal and reverse flow operation of a blower device according to an embodiment of the present invention.

FIG. 8 is a simplified plots of air temperature for normal and reverse flow operation of a blower device according to an embodiment of the present invention. This diagram is merely an example, which should not unduly limit the scope of the claims herein. One of ordinary skill in the art would recognize other variations, modifications, and alternatives. As shown, the vertical axis represents temperature in units of Fahrenheit and the horizontal axis represents modes of operation of the present thermal solar system. In a specific embodiment for "Normal Operation on a Mild Day," air enters the array at a temperature of about 80 Degrees Fahrenheit, exits the array at about 150 Degrees Fahrenheit, and remains substantially at such elevated temperature across the motor and exiting the building. In a specific embodiment for "Normal Operation on a Hot Day," air enters the array at a temperature of about 90 Degrees Fahrenheit, exits the array at over 170 Degrees Fahrenheit, and remains substantially at such elevated temperature across the motor and exiting the building. As noted above, any temperature above 160 Degrees Fahrenheit may lead to damage of the drive device and air handling according to one or more embodiments.

In a specific embodiment, the present system and method can operate to cool the drive device by removing thermal energy from the drive device by reversing the direction of fluid flow from a cooler region back to a hotter region. In a specific embodiment in "Reverse Flow Hot Day" operation, the method transfers cooler air at about 80 Degrees Fahrenheit from an ambient region, traverses the cooler air across the motor, across the exit of the thermal module, and through the thermal array, which elevates the temperature of the cooler air to about 190 Degrees Fahrenheit. As the cooler air traverses across the drive device, it becomes cooler to operate below a threshold temperature, which helps the drive device stay within an MTBF of at least 20,000 hours according to a specific embodiment. Of course, there can be other variations, modifications, and alternatives.

Figure 9:
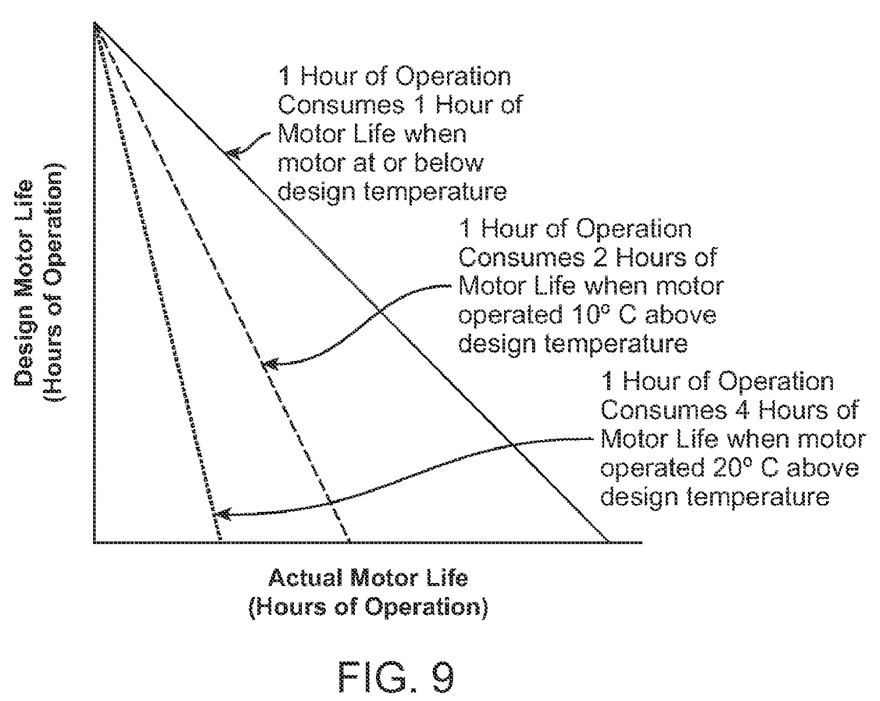
FIG. 9 is a simplified diagram of motor life as a function of operational temperature for a solar system according to an embodiment of the present invention.
Figure 10:
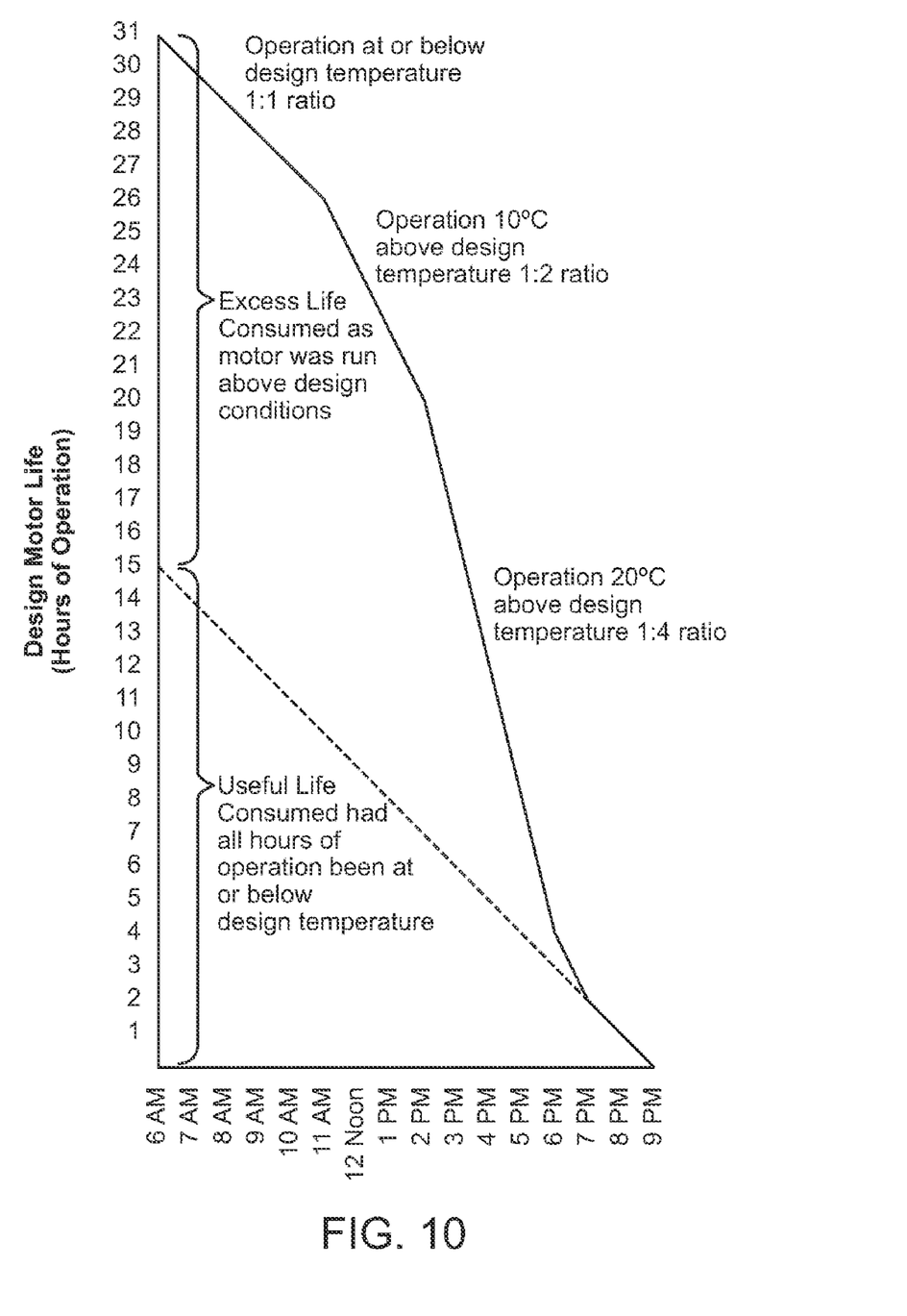
FIG. 10 is a simplified diagram of typical life consumption of motor life for a hot climate.

FIG. 9 is a simplified diagram of motor life as a function of operational temperature for a solar system according to an embodiment of the present invention. This diagram is merely an example, which should not unduly limit the scope of the claims herein. One of ordinary skill in the art would recognize other variations, modifications, and alternatives. To further illustrate degradation of motor life operated at higher temperature, FIG. 10 shows a simplified diagram of typical life consumption of motor life for a hot climate. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A solar energy system comprising:
a thermal solar system comprising a plurality of thermal modules spatially configured as an N by M array, where N is an integer greater than 1, and M is an integer greater than 2, the plurality of thermal modules being configured to form an aperture region and a backside region;
an air plenum configured from at least the backside region, the air plenum having one or more intake regions and one or more exhaust regions;
a first duct coupled to the one or more exhaust regions;
a fluid flow region having a fluid flow intake region coupled to the first duct region, a fluid flow exit region, and a fluid drive region spatially disposed between the fluid flow intake region and the fluid flow exit region;
an air moving device comprising a drive device coupled to a blower device, the drive device being spatially disposed within the fluid drive region;
one or more logic devices operably coupled to the air moving device, the one or more logic devices being configured to operate the blower device in a first direction to cause fluid flow from at least the fluid flow intake region to the fluid flow exit region and to maintain a temperature of no greater than about 200 Degrees Fahrenheit within the fluid drive region by at least changing the first direction of operation of the blower device to a second direction to cause fluid from a third region to flow into the fluid drive region to initiate removal of thermal energy from the fluid drive region; and
a second duct coupled to the fluid flow exit region, the second duct region being coupled to the third region, the third region having a temperature of less than about 100 Degrees Fahrenheit.

2. The system of claim 1 wherein the one or more logic devices comprises a controller is configured to maintain the air plenum formed by at least the backside of the thermal modules substantially free from a no flow condition for a time period of greater than ½ hour while the fluid flow is changing from the first direction to the second direction.

3. The system of claim 2 wherein the no flow condition occurs for less than one minute.

4. The system of claim 2 wherein the fluid flow comprises air flow ranging in temperature from about 32 Degrees F. to about 200 Degrees Fahrenheit.

5. The system of claim 2 further comprising one or more sensing device coupled to the one or more logic device.

6. The system of claim 2 wherein the one or more logic devices is coupled to one or more sensor device operably coupled to the drive device.

7. The system of claim 1 wherein the array is a heat source.

8. The system of claim 1 wherein the drive device comprises an electric motor.

9. The system of claim 1 wherein the drive device comprises an electric motor with high temperature windings, the high temperature windings being configured to withstand about 165 Degrees F.

10. The system of claim 9 wherein the electric motor is a Class F and greater.

11. The system of claim 1 wherein drive device is operable at a range from about 400 RPM to 4000 RPM.

12. The system of claim 1 wherein the blower device comprises a fan device having a centrifugal configuration operably coupled to the drive device.

13. The system of claim 1 wherein the blower device comprises a plurality of blades.

14. The system of claim 1 wherein the maintaining the temperature comprising reducing a temperature of drive device from a first temperature to a second temperature.

15. The system of claim 1 wherein the drive device is disposed within a plenum region for fluid flow.

16. The system of claim 1 further comprising one or more sensing devices within a vicinity of the drive device.

17. The system of claim 1 further comprising a heat exchanger spatially disposed between the one or more exhaust regions and the air moving device.

18. The system of claim 1 wherein the third region comprises an ambient region.

19. The system of claim 1 wherein the third region comprises an internal region of a building structure.

20. The system of claim 1 wherein the drive device is characterized by a life cycle Mean Time Between Chronic Failure ("MTBF") of greater than about 20,000 hours.

21. The system of claim 1 wherein the drive device is characterized by a MTBF by about 10,000 hours and less when the temperature within the fluid drive region exceeds 200 Degrees Fahrenheit.

22. The system of claim 1 wherein the fluid drive region is an air plenum structure comprising a metal material.

* * * * *